United States Patent [19]
Green

[11] Patent Number: 6,041,405
[45] Date of Patent: Mar. 21, 2000

[54] INSTRUCTION LENGTH PREDICTION USING AN INSTRUCTION LENGTH PATTERN DETECTOR

[75] Inventor: Thomas S. Green, Austin, Tex.

[73] Assignee: Advanced Micro Devices, Inc., Sunnyvale, Calif.

[21] Appl. No.: 08/993,476

[22] Filed: Dec. 18, 1997

[51] Int. Cl.[7] .................................................. G06F 9/38
[52] U.S. Cl. ........................... 712/213; 712/210; 712/215
[58] Field of Search ................................... 712/210, 213, 712/215, 204

[56] References Cited

U.S. PATENT DOCUMENTS

| | | | |
|---|---|---|---|
| 5,450,605 | 9/1995 | Grochowski et al. | 712/23 |
| 5,488,710 | 1/1996 | Sato et al. | 711/125 |
| 5,513,330 | 4/1996 | Stiles | 712/204 |
| 5,724,422 | 3/1998 | Shang et al. | 380/4 |
| 5,748,978 | 5/1998 | Narayan et al. | 712/23 |
| 5,751,981 | 5/1998 | Witt et al. | 712/204 |
| 5,809,272 | 9/1998 | Thusoo et al. | 712/210 |
| 5,852,727 | 12/1998 | Narayan et al. | 712/215 |
| 5,881,260 | 3/1999 | Raje et al. | 712/210 |

*Primary Examiner*—Kenneth S. Kim
*Attorney, Agent, or Firm*—Conley, Rose & Tayon, PC; B. Noel Kivlin

[57] ABSTRACT

A microprocessor configured to predict the length of variable length instructions for decoding purposes by detecting patterns of instruction lengths that have been previously decoded. The microprocessor has a cache, an instruction length calculation unit, and a pattern detector. The instruction length calculation unit receives instruction bytes from the cache and generates an instruction length corresponding thereto. The pattern detector stores a plurality of instruction length sequences, each comprising an initial sequence and a final sequence. The pattern detector is configured to receive instruction lengths from the length calculation unit and compare them with the stored initial sequences. If the pattern detector finds a match, it outputs the corresponding final sequence for use as predicted instruction lengths. A method for using instruction length pattern detection for decoding is also disclosed.

19 Claims, 12 Drawing Sheets

INSTRUCTION LENGTH PREDICTION USING AN INSTRUCTION LENGTH PATTERN DETECTOR

BACKGROUND OF THE INVENTION

1. Field of the Invention

This invention relates to microprocessors and more particularly, to determining the length of variable length microprocessor instructions.

2. Description of the Relevant Art

Superscalar microprocessors are capable of attaining performance characteristics which surpass those of conventional scalar processors by allowing the concurrent execution of multiple instructions. Due to the widespread acceptance of the x86 family of microprocessors, efforts have been undertaken by microprocessor manufacturers to develop superscalar microprocessors which execute x86 instructions. Such superscalar microprocessors achieve relatively high performance characteristics while advantageously maintaining backwards compatibility with the vast amount of existing software developed for previous microprocessor generations such as the 8086, 80286, 80386, and 80486.

The x86 instruction set is relatively complex and is characterized by a plurality of variable byte length instructions. A generic format illustrative of the x86 instruction set is shown in FIG. 1. As illustrated in the figure, an x86 instruction consists of from one to five optional prefix bytes 102, followed by an operation code (opcode) field 104, an optional addressing mode (Mod R/M) byte 106, an optional scale-index-base (SIB) byte 108, an optional displacement field 110, and an optional immediate data field 112.

The opcode field 104 defines the basic operation for a particular instruction. The default operation of a particular opcode may be modified by one or more prefix bytes.

For example, a prefix byte may be used to change the address or operand size for an instruction, to override the default segment used in memory addressing, or to instruct the processor to repeat a string operation a number of times. The opcode field 104 follows the prefix bytes 102, if any, and may be one or two bytes in length. The addressing mode (Mod R/M) byte 106 specifies the registers used as well as memory addressing modes. The scale-index-base (SIB) byte 108 is used only in 32-bit base-relative addressing using scale and index factors. A base field of the SIB byte specifies which register contains the base value for the address calculation, and an index field specifies which register contains the index value. A scale field specifies the power of two by which the index value will be multiplied before being added, along with any displacement, to the base value. The next instruction field is the optional displacement field 110, which may be from one to four bytes in length. The displacement field 110 contains a constant used in address calculations. The optional immediate field 112, which may also be from one to four bytes in length, contains a constant used as an instruction operand. The shortest x86 instructions are only one byte long, and comprise a single opcode byte. The 80286 sets a maximum length for an instruction at 10 bytes, while the 80386 and 80486 both allow instruction lengths of up to 15 bytes.

The complexity of the x86 instruction set poses many difficulties in implementing high performance x86 compatible superscalar microprocessors. One difficulty arises from the fact that instructions must be scanned and aligned before proper decode can be effectuated by the parallel-coupled instruction decoders used in such processors. In contrast to most RISC instruction formats, since the x86 instruction set consists of variable byte length instructions, the start bytes of successive instructions within a line are not necessarily equally spaced, and the number of instructions per line is not fixed. As a result, employment of simple, fixed-length shifting logic cannot by itself solve the problem of instruction alignment.

Instead of simple shifting logic, x86 compatible microprocessors typically use instruction scanning mechanisms to generate start and end bits for each instruction byte as they are stored in the instruction cache. These start and end bits are then used to generate a valid mask for each instruction. A valid mask is a series of bits in which each consecutive bit corresponds to a particular byte of instruction information. For a particular instruction fetch, the valid mask bits associated with the first byte of the instruction, the last byte of the instruction, and all bytes in between the first and last bytes of the instruction are asserted. All other bits in the valid mask are not asserted. For example, given the following 8-byte instruction cache line, the following valid mask would be generated for a fetch of instruction B:

| byte → | 0 | 1 | 2 | 3 | 4 | 5 | 6 | 7 |
|---|---|---|---|---|---|---|---|---|
| cache line | A | A | B | B | B | B | C | C |
| bit → | 0 | 1 | 2 | 3 | 4 | 5 | 6 | 7 |
| end bit information | 0 | 1 | 0 | 0 | 0 | 1 | 0 | 0 |
| start bits | 0 | 0 | 1 | 0 | 0 | 0 | 1 | 0 |
| valid mask | 0 | 0 | 1 | 1 | 1 | 1 | 0 | 0 |

Once a valid mask is calculated for a particular instruction fetch, it may then be used to mask off the unwanted bytes that are not part of the particular instruction. In the example above, the valid mask for the fetch of instruction B could be used to mask off the unwanted end bytes of instruction A and the unwanted beginning bytes of instruction C. This masking is typically performed in an instruction alignment unit.

Unfortunately, the process of generating a valid mask and then masking off the undesired bytes is complicated and requires a large number of cascaded logic gates. In contrast, if the actual length of each instruction were known, then simple shifting logic could be used to align the instructions. While scanning logic has been proposed to dynamically find the boundaries of instructions during the decode stage of the pipeline, such solutions typically require the decode pipeline stage of the processor to be implemented with a relatively large number of cascaded levels of logic gates and/or the allocation of several clock cycles to perform the scanning operation. This correspondingly limits the maximum overall clock frequency of the superscalar microprocessor. For these reasons, a fast method for determining the length of variable length instructions and which does not add clock cycles to the decode stage is needed.

SUMMARY OF THE INVENTION

The problems outlined above are in large part solved by an instruction cache having a pattern detector configured in accordance with the present invention. The instruction cache is configured to predict the length of variable length instructions based upon previous instruction length history. The instruction cache comprises an instruction length calculation unit and a pattern detector. The pattern detector comprises a memory structure and update logic.

In one embodiment, the memory structure is a content addressable memory that stores fetch addresses and instruction length sequences. The content addressable memory is configured to compare requested fetch addresses with stored fetch addresses. If there is a match, the content addressable memory is configured to output a corresponding instruction length sequence. If there is not a match, the update logic is configured to store the fetch address into the content addressable memory along with a corresponding instruction length sequence. The instruction length sequence comprises a predetermined number of instruction lengths calculated by the calculation unit.

In another embodiment, the content addressable memory may receive, compare, and store instruction bytes in addition to, or in lieu of, fetch addresses. A neural network or other type of memory configuration may be used in place of the content addressable memory.

A microprocessor using the instruction cache is also contemplated. One embodiment of the microprocessor comprises a cache array, an instruction length calculation unit, and a pattern generator. The cache array is configured to receive a fetch address and in response output a corresponding plurality of instruction bytes. The calculation unit is coupled to the cache array and is configured to receive the plurality of instruction bytes. The calculation unit is configured to generate instruction lengths corresponding to particular instructions within the plurality of instruction bytes. The pattern detector is coupled to the cache array and calculation unit. The pattern detector is configured to store a plurality of fetch addresses and instruction length sequences. Each stored sequence corresponds to a particular stored fetch address. The pattern detector is further configured to output a particular stored sequence of instruction lengths in response to receiving a corresponding fetch address as input.

A method for predicting instruction lengths for variable length instructions is also contemplated. The method comprises reading a plurality of instruction bytes from a cache by using a fetch address and generating instruction lengths for instructions within the plurality of instruction bytes. The fetch addresses and instruction lengths are stored. Each particular fetch address is compared with the stored fetch addresses, and a plurality of predicted instruction lengths are generated by selecting a stored instruction length sequence corresponding to the fetch address being compared. Finally, the predicted sequence of instruction lengths is verified.

BRIEF DESCRIPTION OF THE DRAWINGS

Other objects and advantages of the invention will become apparent upon reading the following detailed description and upon reference to the accompanying drawings in which.

Figure 1:
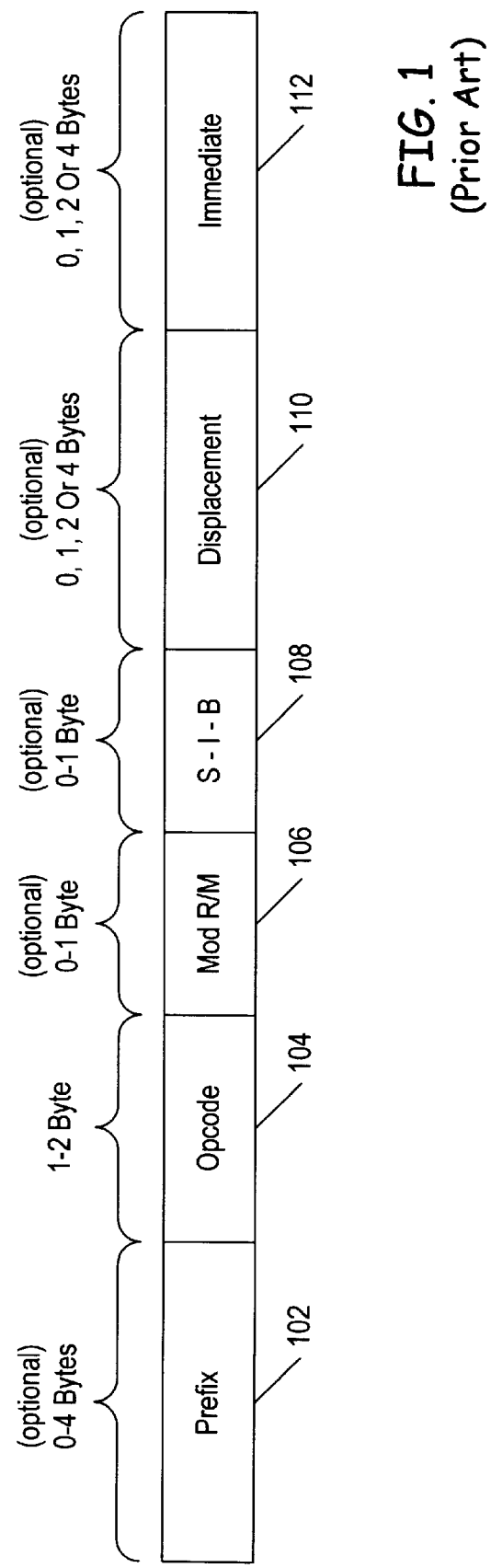
FIG. 1 is a block diagram of a generic x86 instruction format.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

Figure 2:
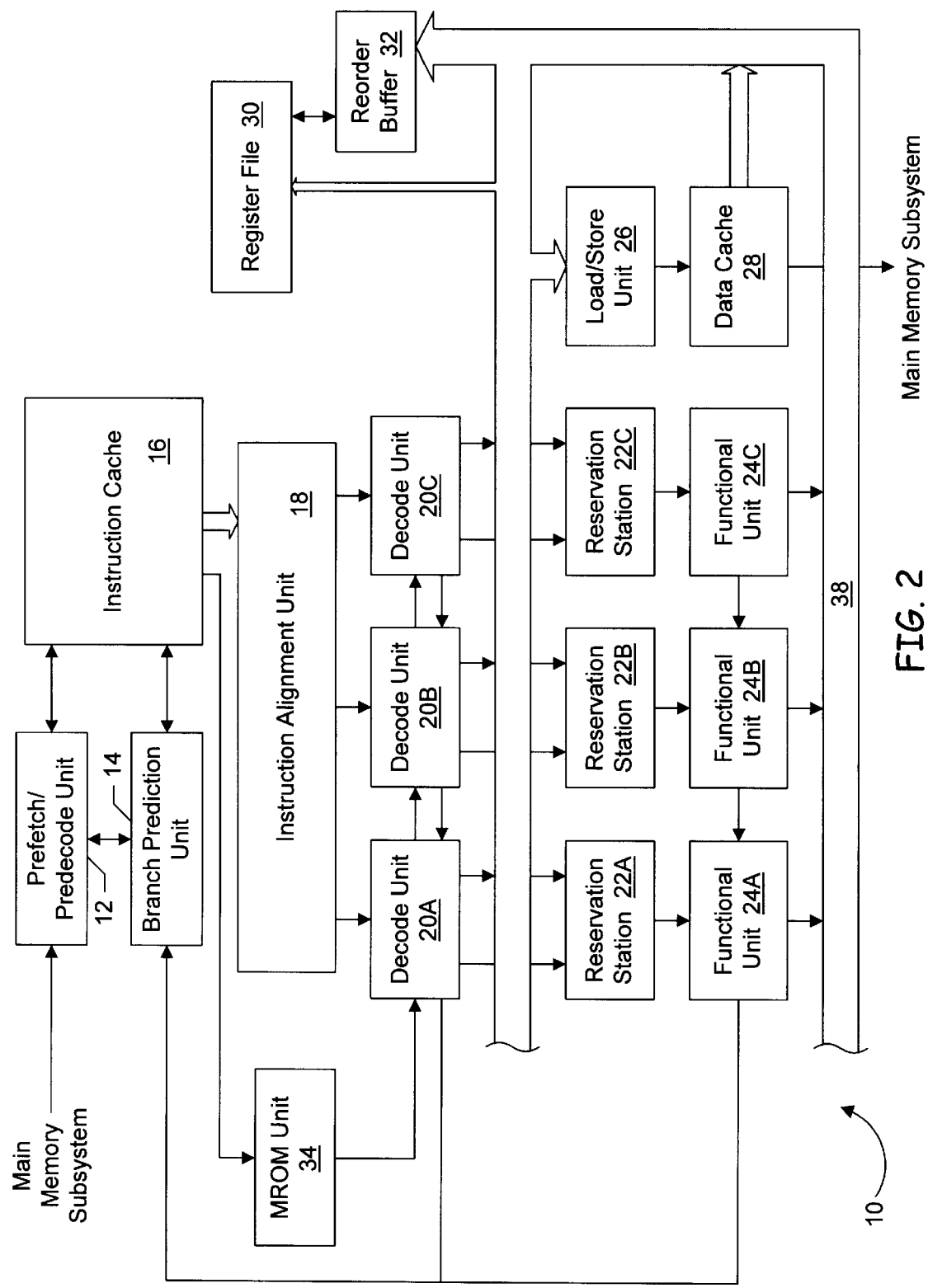
FIG. 2 is a block diagram of a superscalar microprocessor having an instruction cache.

Turning now to FIG. 2, a block diagram of one embodiment of a microprocessor 10 is shown. Microprocessor 10 includes a prefetch/predecode unit 12, a branch prediction unit 14, an instruction cache 16, an instruction alignment unit 18, a plurality of decode units 20A–20C, a plurality of reservation stations 22A–22C, a plurality of functional units 24A–24C, a load/store unit 26, a data cache 28, a register file 30, a reorder buffer 32, and an MROM unit 34. Elements referred to herein with a particular reference number followed by a letter will be collectively referred to by the reference number alone. For example, decode units 20A–20C will be collectively referred to as decode units 20.

Prefetch/predecode unit 12 is coupled to receive instructions from a main memory subsystem (not shown), and is further coupled to instruction cache 16 and branch prediction unit 14. Similarly, branch prediction unit 14 is coupled to instruction cache 16. Still further, branch prediction unit 14 is coupled to decode units 20 and functional units 24. Instruction cache 16 is further coupled to MROM unit 34 and instruction alignment unit 18. Instruction alignment unit 18 is in turn coupled to decode units 20. Each decode unit 20A–20C is coupled to load/store unit 26 and to respective reservation stations 22A–22C. Reservation stations 22A–22C are further coupled to respective functional units 24A–24C. Additionally, decode units 20 and reservation stations 22 are coupled to register file 30 and reorder buffer 32. Functional units 24 are coupled to load/store unit 26, register file 30, and reorder buffer 32 as well. Data cache 28 is coupled to load/store unit 26 and to the main memory subsystem. Finally, MROM unit 34 is coupled to decode units 20.

Instruction cache 16 is a high speed cache memory provided to store instructions. Instructions are fetched from instruction cache 16 and dispatched to decode units 20. In one embodiment, instruction cache 16 is configured to store up to 64 kilobytes of instructions in a 4 way set associative structure having 32 byte lines (a byte comprises 8 binary bits). Alternatively, 2 way set associativity may be employed as well as any other desired associativity. Instruction cache 16 may additionally employ a way prediction scheme in order to speed access times to the instruction cache 16. Instead of accessing tags identifying each line of instructions and comparing the tags to the fetch address to select a way, instruction cache 16 predicts the way that is accessed. In this manner, the way is selected prior to accessing the instruction storage. The access time of instruction cache 16 may be similar to a direct-mapped cache. A tag comparison is performed and, if the way prediction is incorrect, the correct instructions are fetched and the incorrect instructions are discarded. It is noted that instruction cache 16 may be implemented as a fully associative, set associative, or direct mapped configuration.

Instructions are fetched from main memory and stored into instruction cache 16 by prefetch/predecode unit 12. Instructions may be prefetched prior to the request thereof from instruction cache 16 in accordance with a prefetch scheme. A variety of prefetch schemes may be employed by prefetch/predecode unit 12. As prefetch/predecode unit 12 transfers instructions from main memory to instruction cache 16, prefetch/predecode unit 12 generates three predecode bits for each byte of the instructions: a start bit, an end bit, and a functional bit. The predecode bits form tags indicative of the boundaries of each instruction. The predecode tags may also convey additional information such as whether a given instruction can be decoded directly by decode units 20 or whether the instruction is executed by invoking a microcode procedure controlled by MROM unit 34, as will be described in greater detail below. Still further, prefetch/predecode unit 12 may be configured to detect branch instructions and to store branch prediction information corresponding to the branch instructions into branch prediction unit 14.

One encoding of the predecode tags for an embodiment of microprocessor 10 employing a variable byte length instruction set will next be described. A variable byte length instruction set is an instruction set in which different instructions may occupy differing numbers of bytes. An exemplary variable byte length instruction set employed by one embodiment of microprocessor 10 is the x86 instruction set.

In the exemplary encoding, if a given byte is the first byte of an instruction, the start bit for that byte is set. If the byte is the last byte of an instruction, the end bit for that byte is set. Instructions which may be directly decoded by decode units 20 are referred to as "fast path" instructions. The remaining x86 instructions are referred to as MROM instructions, according to one embodiment. For fast path instructions, the functional bit is set for each prefix byte included in the instruction, and cleared for other bytes. Alternatively, for MROM instructions, the functional bit is cleared for each prefix byte and set for other bytes. The type of instruction may be determined by examining the functional bit corresponding to the end byte. If that functional bit is clear, the instruction is a fast path instruction. Conversely, if that functional bit is set, the instruction is an MROM instruction. The opcode of an instruction may thereby be located within an instruction which may be directly decoded by decode units 20 as the byte associated with the first clear functional bit in the instruction. For example, a fast path instruction including two prefix bytes, a Mod R/M byte, and an immediate byte would have start, end, and functional bits as follows:

| | |
|---|---|
| Start bits | 10000 |
| End bits | 00001 |
| Functional bits | 11000 |

According to one particular embodiment, early identification of an instruction that includes a scale-index-base (SIB) byte is advantageous for MROM unit 34. For such an embodiment, if an instruction includes at least two bytes after the opcode byte, the functional bit for the Mod R/M byte indicates the presence of an SIB byte. If the functional bit for the Mod R/M byte is set, then an SIB byte is present. Alternatively, if the functional bit for the Mod R/M byte is clear, then an SIB byte is not present.

MROM instructions are instructions which are determined to be too complex for decode by decode units 20. MROM instructions are executed by invoking MROM unit 34. More specifically, when an MROM instruction is encountered, MROM unit 34 parses and issues the instruction into a subset of defined fast path instructions to effectuate the desired operation. MROM unit 34 dispatches the subset of fast path instructions to decode units 20. A listing of exemplary x86 instructions categorized as fast path instructions will be provided further below.

Before proceeding with a detailed description of the valid mask generator used within instruction cache 16, general aspects regarding other subsystems employed within the exemplary superscalar microprocessor 10 of FIG. 2 will be described.

Microprocessor 10 employs branch prediction in order to speculatively fetch instructions subsequent to conditional branch instructions. Branch prediction unit 14 is included to perform branch prediction operations. In one embodiment, up to two branch target addresses are stored with respect to each 16 byte portion of each cache line in instruction cache 16. Prefetch/predecode unit 12 determines initial branch targets when a particular line is predecoded. Subsequent updates to the branch targets corresponding to a cache line may occur due to the execution of instructions within the cache line. Instruction cache 16 provides an indication of the instruction address being fetched, so that branch prediction unit 14 may determine which branch target addresses to select for forming a branch prediction. Decode units 20 and functional units 24 provide update information to branch prediction unit 14. Because branch prediction unit 14 stores two targets per 16 byte portion of the cache line, some branch instructions within the line may not be stored in branch prediction unit 14. Decode units 20 detect branch instructions which were not predicted by branch prediction unit 14. Functional units 24 execute the branch instructions and determine if the predicted branch direction is incorrect. The branch direction may be "taken", in which subsequent instructions are fetched from the target address of the branch instruction. Conversely, the branch direction may be "not taken", in which subsequent instructions are fetched from memory locations consecutive to the branch instruction. When a mispredicted branch instruction is detected, instructions subsequent to the mispredicted branch are discarded from the various units of microprocessor 10. A variety of suitable branch prediction algorithms may be employed by branch prediction unit 14.

Instructions fetched from instruction cache 16 are conveyed to instruction alignment unit 18. As instructions are fetched from instruction cache 16, the corresponding predecode data is scanned to provide information to instruction alignment unit 18 (and to MROM unit 34) regarding the instructions being fetched. Instruction alignment unit 18 utilizes the scanning data to align an instruction to each of decode units 20. In one embodiment, instruction alignment unit 18 aligns instructions from three sets of eight instruction bytes to decode units 20. Instructions are selected independently from each set of eight instruction bytes into preliminary issue positions. The preliminary issue positions are then merged to a set of aligned issue positions corresponding to decode units 20, such that the aligned issue positions contain the three instructions which are prior to other instructions within the preliminary issue positions in program order. Decode unit 20A receives an instruction which is prior to instructions concurrently received by decode units 20B and 20C (in program order). Similarly, decode unit 20B receives an instruction which is prior to the instruction concurrently received by decode unit 20C in program order.

Decode units 20 are configured to decode instructions received from instruction alignment unit 18. Register operand information is detected and routed to register file 30 and reorder buffer 32. Additionally, if the instructions require one or more memory operations to be performed, decode units 20 dispatch the memory operations to load/store unit 26. Each instruction is decoded into a set of control values for functional units 24, and these control values are dispatched to reservation stations 22 along with operand address information and displacement or immediate data which may be included with the instruction.

Microprocessor 10 supports out of order execution, and thus employs reorder buffer 32 to keep track of the original program sequence for register read and write operations, to implement register renaming, to allow for speculative instruction execution and branch misprediction recovery, and to facilitate precise exceptions. A temporary storage location within reorder buffer 32 is reserved upon decode of an instruction that involves the update of a register to thereby store speculative register states. If a branch prediction is incorrect, the results of speculatively-executed instructions along the mispredicted path can be invalidated in the buffer before they are written to register file 30. Similarly, if a particular instruction causes an exception, instructions subsequent to the particular instruction may be discarded. In this manner, exceptions are "precise" (i.e. instructions subsequent to the particular instruction causing the exception are not completed prior to the exception). It is noted that a particular instruction is speculatively executed if it is executed prior to instructions which precede the particular instruction in program order. Preceding instructions may be a branch instruction or an exception-causing instruction, in which case the speculative results may be discarded by reorder buffer 32.

The instruction control values and immediate or displacement data provided at the outputs of decode units 20 are routed directly to respective reservation stations 22. In one embodiment, each reservation station 22 is capable of holding instruction information (i.e., instruction control values as well as operand values, operand tags and/or immediate data) for up to three pending instructions awaiting issue to the corresponding functional unit. It is noted that for the embodiment of FIG. 1, each reservation station 22 is associated with a dedicated functional unit 24. Accordingly, three dedicated "issue positions" are formed by reservation stations 22 and functional units 24. In other words, issue position 0 is formed by reservation station 22A and functional unit 24A. Instructions aligned and dispatched to reservation station 22A are executed by functional unit 24A. Similarly, issue position 1 is formed by reservation station 22B and functional unit 24B; and issue position 2 is formed by reservation station 22C and functional unit 24C.

Upon decode of a particular instruction, if a required operand is a register location, register address information is routed to reorder buffer 32 and register file 30 simultaneously. Those of skill in the art will appreciate that the x86 register file includes eight 32 bit real registers (i.e., typically referred to as EAX, EBX, ECX, EDX, EBP, ESI, EDI and ESP). In embodiments of microprocessor 10 which employ the x86 microprocessor architecture, register file 30 comprises storage locations for each of the 32 bit real registers. Additional storage locations may be included within register file 30 for use by MROM unit 34. Reorder buffer 32 contains temporary storage locations for results which change the contents of these registers to thereby allow out of order execution. A temporary storage location of reorder buffer 32 is reserved for each instruction which, upon decode, is determined to modify the contents of one of the real registers. Therefore, at various points during execution of a particular program, reorder buffer 32 may have one or more locations which contain the speculatively executed contents of a given register. If following decode of a given instruction it is determined that reorder buffer 32 has a previous location or locations assigned to a register used as an operand in the given instruction, the reorder buffer 32 forwards to the corresponding reservation station either: 1) the value in the most recently assigned location, or 2) a tag for the most recently assigned location if the value has not yet been produced by the functional unit that will eventually execute the previous instruction. If reorder buffer 32 has a location reserved for a given register, the operand value (or reorder buffer tag) is provided from reorder buffer 32 rather than from register file 30. If there is no location reserved for a required register in reorder buffer 32, the value is taken directly from register file 30. If the operand corresponds to a memory location, the operand value is provided to the reservation station through load/store unit 26.

In one particular embodiment, reorder buffer 32 is configured to store and manipulate concurrently decoded instructions as a unit. This configuration will be referred to herein as "line-oriented". By manipulating several instructions together, the hardware employed within reorder buffer 32 may be simplified. For example, a line-oriented reorder buffer included in the present embodiment allocates storage sufficient for instruction information pertaining to three instructions (one from each decode unit 20) whenever one or more instructions are dispatched by decode units 20. By contrast, a variable amount of storage is allocated in conventional reorder buffers, dependent upon the number of instructions actually dispatched. A comparatively larger number of logic gates may be required to allocate the variable amount of storage. When each of the concurrently decoded instructions has executed, the instruction results are stored into register file 30 simultaneously. The storage is then free for allocation to another set of concurrently decoded instructions. Additionally, the amount of control logic circuitry employed per instruction is reduced because the control logic is amortized over several concurrently decoded instructions. A reorder buffer tag identifying a particular instruction may be divided into two fields: a line tag and an offset tag. The line tag identifies the set of concurrently decoded instructions including the particular instruction, and the offset tag identifies which instruction within the set corresponds to the particular instruction. It is noted that storing instruction results into register file 30 and freeing the corresponding storage is referred to as "retiring" the instructions. It is further noted that any reorder buffer configuration may be employed in various embodiments of microprocessor 10.

As noted earlier, reservation stations 22 store instructions until the instructions are executed by the corresponding functional unit 24. An instruction is selected for execution if (i) the operands of the instruction have been provided; and (ii) the operands have not yet been provided for instructions which are within the same reservation station 22A–22C and which are prior to the instruction in program order. It is noted that when an instruction is executed by one of the functional units 24, the result of that instruction is passed directly to any reservation stations 22 that are waiting for that result at the same time the result is passed to update reorder buffer 32 (this technique is commonly referred to as "result forwarding"). An instruction may be selected for execution and passed to a functional unit 24A–24C during the clock cycle that the associated result is forwarded. Reservation stations 22 route the forwarded result to the functional unit 24 in this case.

In one embodiment, each of the functional units 24 is configured to perform integer arithmetic operations of addition and subtraction, as well as shifts, rotates, logical operations, and branch operations. The operations are performed in response to the control values decoded for a particular instruction by decode units 20. It is noted that a floating point unit (not shown) may also be employed to accommodate floating point operations. The floating point unit may be operated as a coprocessor, receiving instructions from MROM unit 34 and subsequently communicating with reorder buffer 32 to complete the instructions. Additionally, functional units 24 may be configured to perform address generation for load and store memory operations performed by load/store unit 26.

Each of the functional units 24 also provides information regarding the execution of conditional branch instructions to the branch prediction unit 14. If a branch prediction was incorrect, branch prediction unit 14 flushes instructions subsequent to the mispredicted branch that have entered the instruction processing pipeline, and causes fetch of the required instructions from instruction cache 16 or main memory. It is noted that in such situations, results of instructions in the original program sequence which occur after the mispredicted branch instruction are discarded, including those which were speculatively executed and temporarily stored in load/store unit 26 and reorder buffer 32.

Results produced by functional units 24 are sent to reorder buffer 32 if a register value is being updated, and to load/store unit 26 if the contents of a memory location are changed. If the result is to be stored in a register, reorder buffer 32 stores the result in the location reserved for the value of the register when the instruction was decoded. A plurality of result buses 38 are included for forwarding of results from functional units 24 and load/store unit 26. Result buses 38 convey the result generated, as well as the reorder buffer tag identifying the instruction being executed.

Load/store unit 26 provides an interface between functional units 24 and data cache 28. In one embodiment, load/store unit 26 is configured with a load/store buffer having eight storage locations for data and address information for pending loads or stores. Decode units 20 arbitrate for access to the load/store unit 26. When the buffer is full, a decode unit must wait until load/store unit 26 has room for the pending load or store request information. Load/store unit 26 also performs dependency checking for load memory operations against pending store memory operations to ensure that data coherency is maintained. A memory operation is a transfer of data between microprocessor 10 and the main memory subsystem. Memory operations may be the result of an instruction which utilizes an operand stored in memory, or may be the result of a load/store instruction which causes the data transfer but no other operation. Additionally, load/store unit 26 may include a special register storage for special registers such as the segment registers and other registers related to the address translation mechanism defined by the x86 microprocessor architecture.

In one embodiment, load/store unit 26 is configured to perform load memory operations speculatively. Store memory operations are performed in program order, but may be speculatively stored into the predicted way. If the predicted way is incorrect, the data prior to the store memory operation is subsequently restored to the predicted way and the store memory operation is performed to the correct way. In another embodiment, stores may be executed speculatively as well. Speculatively executed stores are placed into a store buffer, along with a copy of the cache line prior to the update. If the speculatively executed store is later discarded due to branch misprediction or exception, the cache line may be restored to the value stored in the buffer. It is noted that load/store unit 26 may be configured to perform any amount of speculative execution, including no speculative execution.

Data cache 28 is a high speed cache memory provided to temporarily store data being transferred between load/store unit 26 and the main memory subsystem. In one embodiment, data cache 28 has a capacity of storing up to sixteen kilobytes of data in an eight way set associative structure. Similar to instruction cache 16, data cache 28 may employ a way prediction mechanism. It is understood that data cache 28 may be implemented in a variety of specific memory configurations, including a set associative configuration.

In one particular embodiment of microprocessor 10 employing the x86 microprocessor architecture, instruction cache 16 and data cache 28 are linearly addressed. The linear address is formed from the offset specified by the instruction and the base address specified by the segment portion of the x86 address translation mechanism. Linear addresses may optionally be translated to physical addresses for accessing a main memory. The linear to physical translation is specified by the paging portion of the x86 address translation mechanism. It is noted that a linear addressed cache stores linear address tags. A set of physical tags (not shown) may be employed for mapping the linear addresses to physical addresses and for detecting translation aliases. Additionally, the physical tag block may perform linear to physical address translation.

It is still further noted that the present discussion may refer to the assertion of various signals. As used herein, a signal is "asserted" if it conveys a value indicative of a particular condition. Conversely, a signal is "deasserted" or "not asserted" if it conveys a value indicative of a lack of a particular condition. A signal may be defined to be asserted when it conveys a logical zero value or, conversely, when it conveys a logical one value. Additionally, various values have been described as being discarded in the above discussion. A value may be discarded in a number of manners, but generally involves modifying the value such that it is ignored by logic circuitry which receives the value. For example, if the value comprises a bit, the logic state of the value may be inverted to discard the value. If the value is an n-bit value, one of the n-bit encodings may indicate that the value is invalid. Setting the value to the invalid encoding causes the value to be discarded. Additionally, an n-bit value may include a valid bit indicative, when set, that the n-bit value is valid. Resetting the valid bit may comprise discarding the value. Other methods of discarding a value may be used as well.

Figure 3:
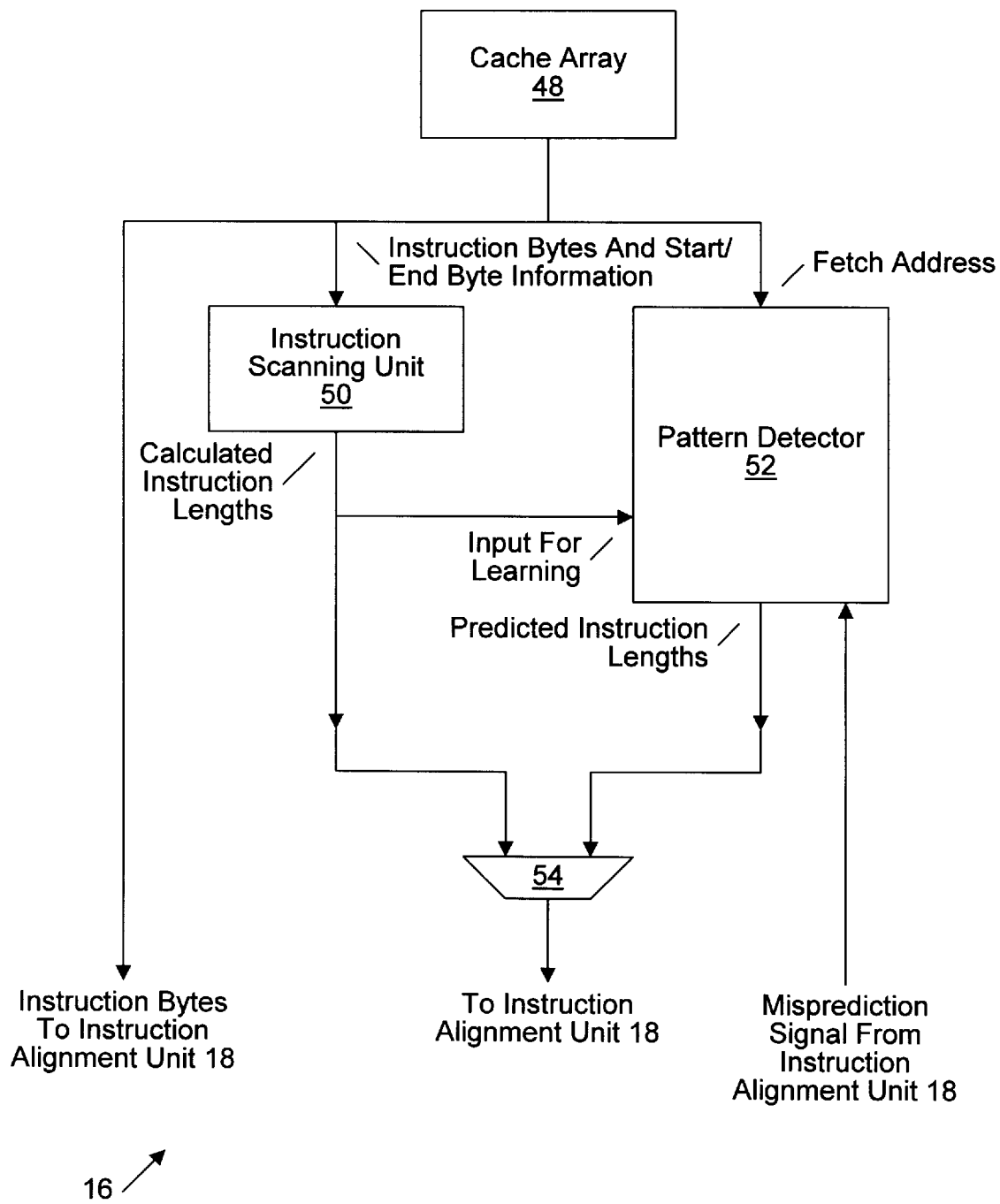
FIG. 3 is a block diagram of one embodiment of the instruction cache from FIG. 2.

Turning now to FIG. 3, one embodiment of instruction cache 16 is shown. In this embodiment instruction cache 16 comprises instruction cache array 48, instruction length calculation unit 50, pattern detector 52, and multiplexer 54. Cache array 48 is coupled to instruction length calculation unit 50 and pattern detector 52. Instruction length calculation unit 50 is coupled to pattern detector 52 and multiplexer 54. Pattern detector 52 is also coupled to multiplexer 54.

Cache array 48 is configured to store a plurality of cache lines, each comprising a plurality of instruction bytes and associated start and end bit information. As previously noted, cache array may direct mapped or set associative. Upon receiving a fetch address, cache array 48 is configured to output a corresponding cache line (beginning with the fetch address) to instruction scanning unit 50 and pattern detector 52. In the event that cache array 48 is set associative, the proper way is selected using address tags before the correct cache line is output to instruction length calculation unit 50.

Instruction length calculation unit 50 is configured to calculate the length of instructions within the cache line it receives from cache array 48. In one embodiment, instruction length calculation unit 50 calculates the instruction length by using the start and end bits that are received along with the instruction bytes from cache array 48. As previously noted, start and end bits are generated by prefetch/predecode unit 12 when the instruction bytes are first written into cache array 48. When instruction length calculation unit 50 has completed its calculations, the instruction length is output to pattern detector 52 and multiplexer 54.

In one embodiment, pattern detector 52 is configured to receive fetch addresses from cache array 48. When cache array 48 outputs the instruction bytes to instruction length calculation unit 50, it also outputs the corresponding fetch address to pattern detector 52. Pattern detector 52 uses the fetch address to predict the sequence of instruction lengths that should follow the fetch address. Note that the entire fetch address need not be used or receive by pattern detector 52. For example, only the lowest eight bits might be used. The actual prediction mechanism used by pattern detector 52 will be explained in detail below. If pattern detector 52 is able to predict a sequence of instruction lengths corresponding to the fetch address it received, the sequence is output to multiplexer 54.

Multiplexer 54 is configured to select either the calculated instruction length from instruction length calculation unit 50 or the predicted sequence of instruction lengths generated by pattern detector 52. Multiplexer is configured to select the predicted sequence of instructions from pattern detector 52 if there is one. If not, multiplexer selects the calculated instruction length from instruction length calculation unit 50. Multiplexer 54 outputs the selected instruction lengths to instruction alignment unit 18.

Instruction alignment unit 18 also receives the corresponding instruction bytes from cache array 48. Once alignment unit 18 has received both the instruction bytes and corresponding instruction lengths, it uses simple shifting logic to align the instructions and route them to decode units 20A–20C. In one embodiment, alignment unit 18 also receives the start and end bits associated with the instruction bytes. Alignment unit 18 may use these to perform a quick verification of the instruction lengths it receives. Verification may involve performing Boolean arithmetic on the start and end bits to ensure that the first end bit after the starting byte of the instruction corresponds with the last byte of the instruction. This may be performed with simple logic gates and should not add any significant time to decoding because it may be performed in parallel with alignment and or decoding. If an instruction length misprediction is detected, alignment unit 18 may signal pattern detector 52 and (possibly decoders 20A–20C). Alignment unit 18 may then wait for instruction length calculation unit 50 to calculate the actual instruction lengths before realigning the instructions and dispatching then to decoders 20–20C. By allowing pattern detector 52 to predict a sequence of instruction lengths, alignment unit 18 may advantageously align a large number of instructions in a short period of time.

Figure 4A:
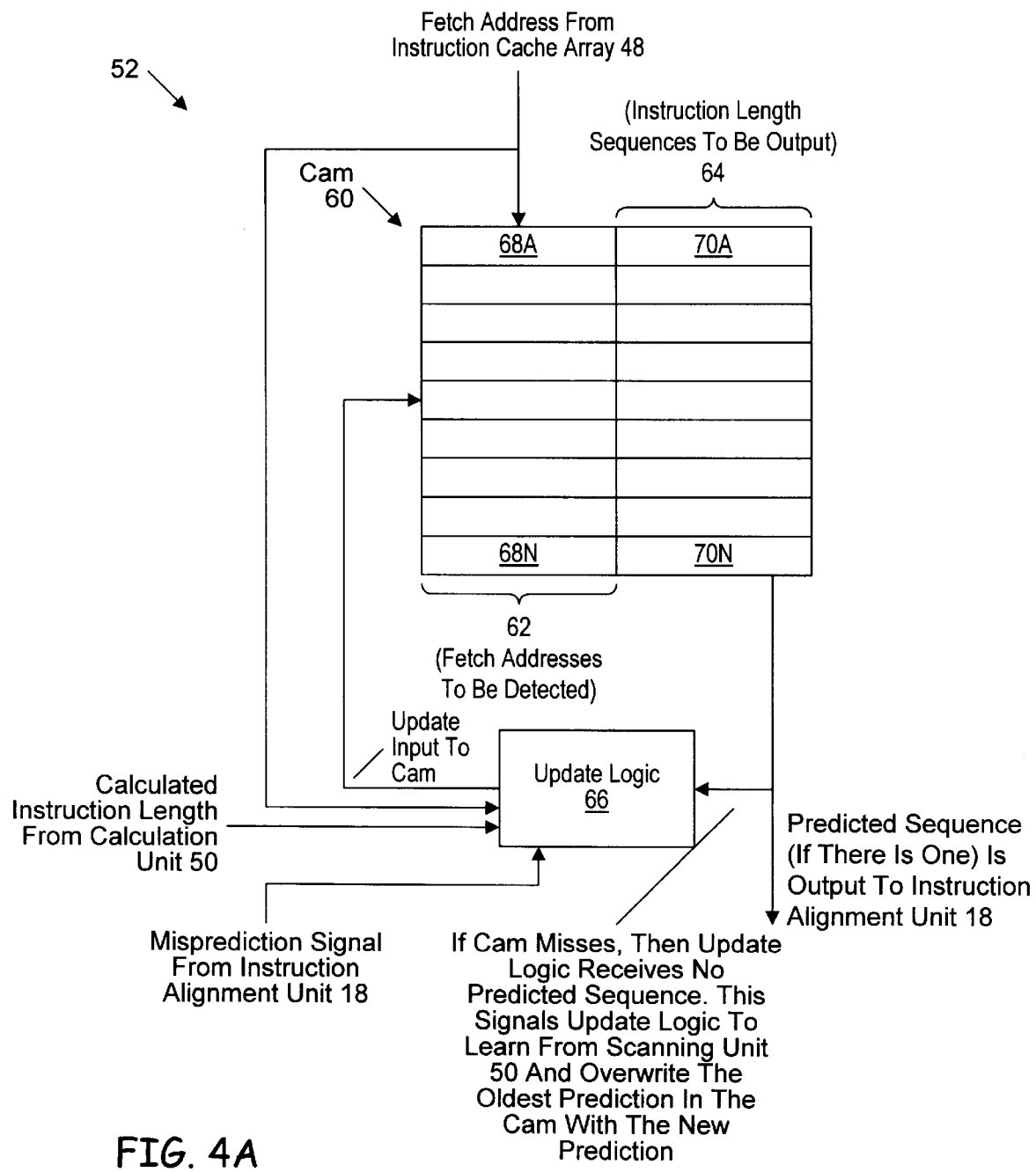
FIG. 4A is a block diagram showing one embodiment of the pattern detector from FIG. 3.

Turning now to FIG. 4A, detail of one embodiment of pattern detector 52 is shown. Pattern detector 52 comprises a content addressable memory (CAM) 60 and update logic 66. CAM 60 comprises a plurality of fetch address storage locations 62 and a plurality of instruction length sequence storage locations 64. CAM 60 is configured to receive requested fetch addresses from instruction cache array 48. Once a fetch address is received, CAM 60 compares the address with each of the addresses stored in fetch address storage locations 68A–68N. If there is a match, CAM 60 outputs the corresponding instruction sequence stored in one of instruction length sequence storage locations 70A–70N.

Update logic 66 is configured to receive both the requested fetch address from cache array 48 and the instruction length sequence output by CAM 60 (if there is one). Update logic 66 will detect whether the fetch address hit in CAM 60 (by receiving a length sequence) or missed in CAM 60 (by not receiving a length sequence). In the event of a miss in CAM 60, update logic 66 latches the missing fetch address and enters a "learning" or pattern detection mode. Once in the learning mode, update logic monitors the output of instruction length calculation unit 50 and latches a predetermined number of instruction lengths output by calculation unit 50. For example, after receiving a fetch address that missed in CAM 60, update logic 66 may latch the next three instruction lengths calculated by calculation unit 50. The three instruction lengths correspond to the lengths of the instructions following the requested fetch address. Once the three instruction lengths are latched, update logic 66 is configured to convey the fetch address, the sequence of instruction lengths, and an update signal to CAM 60. The update signal acts as a write mode enable and causes CAM 60 to store the fetch address in one of fetch address storage locations 68A–68N. The accompanying sequence of instruction lengths is stored by CAM 60 in a corresponding storage location 70A–70N within the plurality of instruction length sequence storage locations 64. CAM 60 may use a number of different algorithms to select which storage location to overwrite if storage locations 68A–68N are full. For example, CAM 60 may use a FIFO algorithm, or CAM 60 may use an algorithm similar to that used in data cache 28, i.e., tracking which fetch addresses are accessed and then overwriting the fetch address with the oldest last access.

Advantageously, when a fetch address hits in CAM 60, pattern detector 52 may rapidly output a number of stored instruction lengths. This may enable instruction alignment unit 18 to quickly align a number of instructions in a much shorter period of time than otherwise possible. As the same fetch addresses may by used a number of times, e.g., in a loop, the instruction lengths need only be calculated once and then stored into CAM 60. Because pattern detector 52 operates in parallel with instruction length calculation unit 50, a miss in CAM 60 does not slow instruction length calculation. However, a hit in CAM 60 may dramatically reduce the time that instruction alignment unit 18 must wait for instruction lengths.

A further advantage of pattern generator 52 is the accuracy of the predicted instruction length sequences. The sequences are stored by fetch address, thus they are unlikely to change over time. In other words, the length of instructions following a particular fetch address are likely to remain constant as the program executes. There are only a few instances when the instruction lengths may change. First, if one of the instructions immediately following the fetch address is a conditional branch, the instruction length sequence may change depending upon whether the branch is taken or not taken. Second, if the code is self-modifying the instruction lengths following a particular fetch address may change.

The first problem may be dealt with by excluding fetch addresses from CAM 60 if they precede conditional branch instructions. In one embodiment, update logic 66 may be configured to receive the first few instruction bytes corresponding to the fetch address. If the instruction bytes contain a value that may be a branch instruction, update logic 66 may be configured to prevent the fetch address from being stored in CAM 60.

Alternatively, CAM 60 may be configured to use branch prediction information from branch prediction unit 14 for branch instructions. In one embodiment, CAM 60 may be configured to store two predictions for fetch addresses that precede conditional branches, i.e., a branch taken prediction and a branch not taken prediction. The selection of which prediction to be output would then be based upon the most recent branch prediction information available in branch prediction unit 14 at the time an initial sequence match occurs in CAM 60.

The second problem, self-modifying code, should not dramatically affect the performance of instruction cache 16 because self-modifying code typically accounts for a very small portion of all code executed. Note that as long as linear fetch addresses are used by CAM 60, changes in memory, e.g., paging for virtual memory, should not affect the instruction length sequence for a particular fetch address.

In the event of a misprediction, update logic 66 may be configured to receive an instruction length misprediction signal from alignment unit 18. When update logic 66 receives a misprediction signal, it may direct CAM 60 to invalidate or clear the incorrectly predicted instruction length sequence, i.e., the sequence most recently output to instruction alignment unit 18. Update logic 66 or alignment unit 18 may signal calculation unit 50 to calculate the correct instruction lengths for the mispredicted sequence. In one embodiment, update logic 66 is configured to direct CAM 60 to overwrite the incorrect prediction with the correct values calculated by instruction length calculation unit 50.

In another embodiment, update logic 66 may be configured to store the incorrect prediction (either internally or within CAM 60 with a special tag) instead of clearing it. Update logic 66 may then track the performance of the new prediction versus the old prediction, e.g., by maintaining a counter of the number of correct predictions for each prediction. If the old prediction outperforms the new prediction, update logic 66 may signal CAM 60 to use the old prediction. If the new prediction outperforms the old prediction by a predetermined margin, update logic 66 may then discard the old prediction.

Figure 4B:
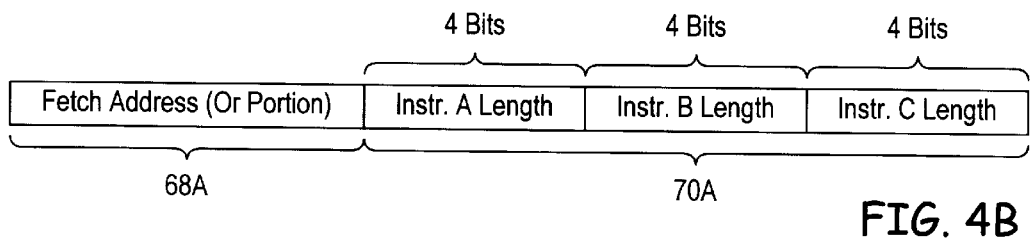
FIG. 4B is a block diagram showing one embodiment of a storage location within the pattern detector from FIG. 4A.

Turning now to FIG. 4B, details of one pair of storage locations within CAM 60 are shown. Storage location 68A may be configured to store all or a portion of a fetch address. Storage location 70A, which corresponds to storage location 68A, is configured to store a predetermined number of instruction lengths. The embodiment shown in FIG. 4B is configured to store an instruction sequence comprising three instruction lengths. In one embodiment, the number of instruction lengths in the sequence is equal to the number of decode units 20A–20C. Storage location 70A is configured to store each instruction length as a four-bit value which accommodates the x86 instruction length range of one to fifteen bytes. Note however that other bit lengths may be used. As previously noted, some configurations may only a portion of the fetch address. This may advantageously reduce the amount of space needed by CAM 60. Note that CAM 60 may be configured as part of cache array 48.

Figure 5A:
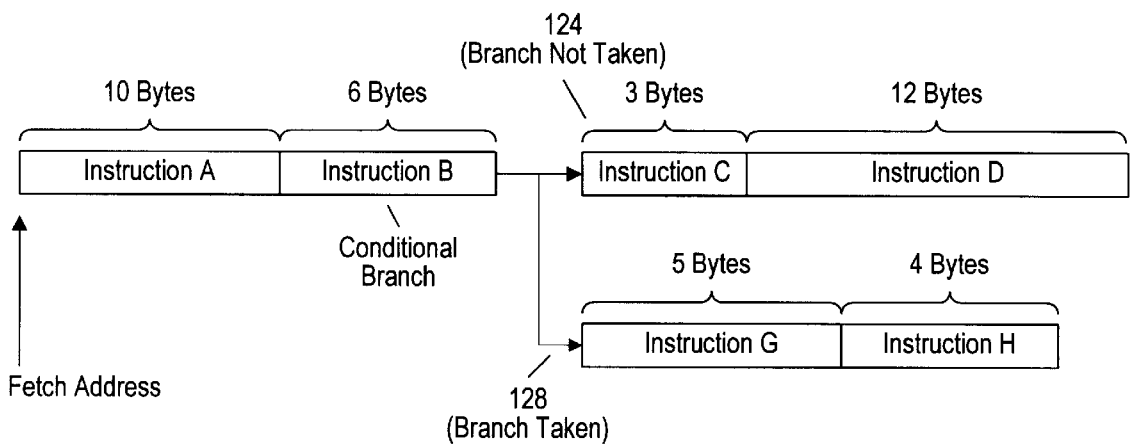
FIG. 5A is a block diagram showing the variance in instruction length sequences due to conditional branch instructions.

In another embodiment, pattern detector 52 is further configured to receive a cancel signal from decoder units 20A–20C when a conditional branch instruction is decoded. This cancel signal, which is accompanied by the conditional branch instruction's fetch address, is used by pattern detector 52 to invalidate or clear any predictions stored in CAM 60 having a fetch address (or portion thereof) within a predetermined range of the conditional branch's fetch address. Predicted instruction length sequences for fetch addresses before conditional branches may be incorrect because the instruction sequence may vary each time through the branch. This problem is illustrated in FIG. 5A. If the conditional branch is taken (126), the instruction length sequence from the fetch address is 10-6-5-4, while if the branch is not taken (124), the instruction length sequence is 10-6-3-12.

Figure 5B:
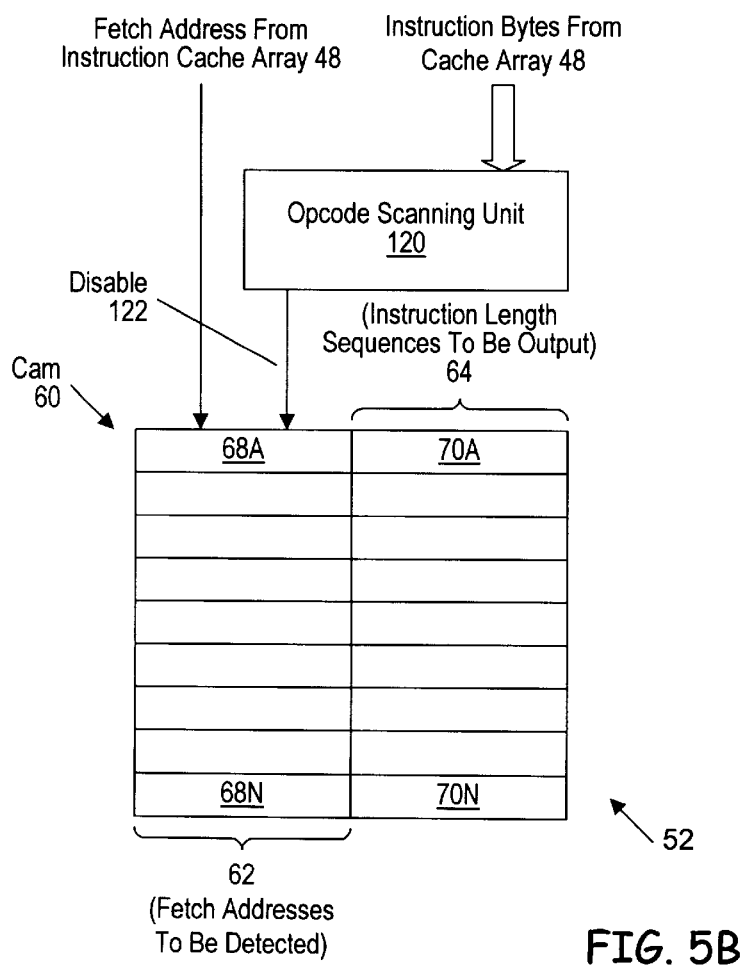
FIG. 5B is a block diagram showing another embodiment of the pattern detector from FIG. 3.

Turning now to FIG. 5B, an embodiment of pattern detector 52 which is configured to avoid storing predictions and fetch addresses associated with conditional branch instructions is shown. In this embodiment, pattern detector 52 is configured to receive instruction bytes from cache array 48 along with the fetch address. Opcode scanning unit 120 examines the instruction bytes for any values that may correspond to conditional branch instructions. For example, if any of the instruction bytes have the hexadecimal value "75" (i.e., possibly corresponding to JNZ, a conditional jump instruction), then CAM 60 would be disabled via disable line 122. A drawback of this approach is that fetch addresses may be excluded even though they do not have a conditional branch. This is because the starting position of each instruction within the instruction bytes is not known (e.g., the hexadecimal value "75" may actually be prefix bytes or data bytes). However, this approach does provide a simple method for reducing mispredictions due to conditional branches.

Figure 6:
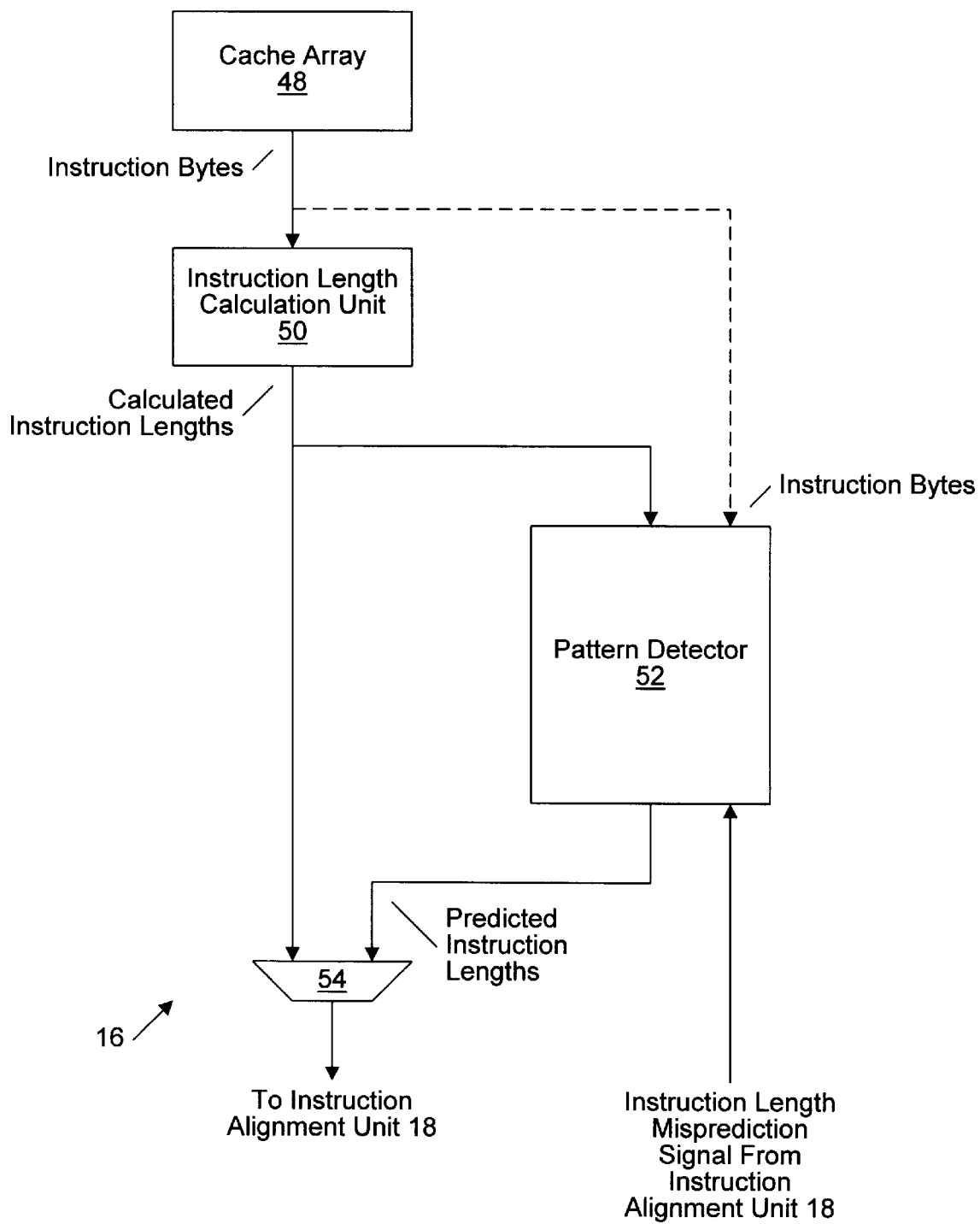
FIG. 6 is a block diagram of another embodiment of the instruction cache from FIG. 2.

Turning now to FIG. 6, another embodiment of instruction cache 16 is shown. In this embodiment, pattern detector 52 is configured to use calculated instruction lengths from calculation unit 50 (and optionally instruction bytes from cache array 48) to predict and select instruction length sequences for output. Unlike the embodiments depicted in FIG. 3 and FIG. 5B, the fetch address is not used. In this embodiment, pattern generator 52 determines which, if any, instruction length sequences are to output based upon the calculated instruction lengths received from calculation unit 50.

Figure 7A:
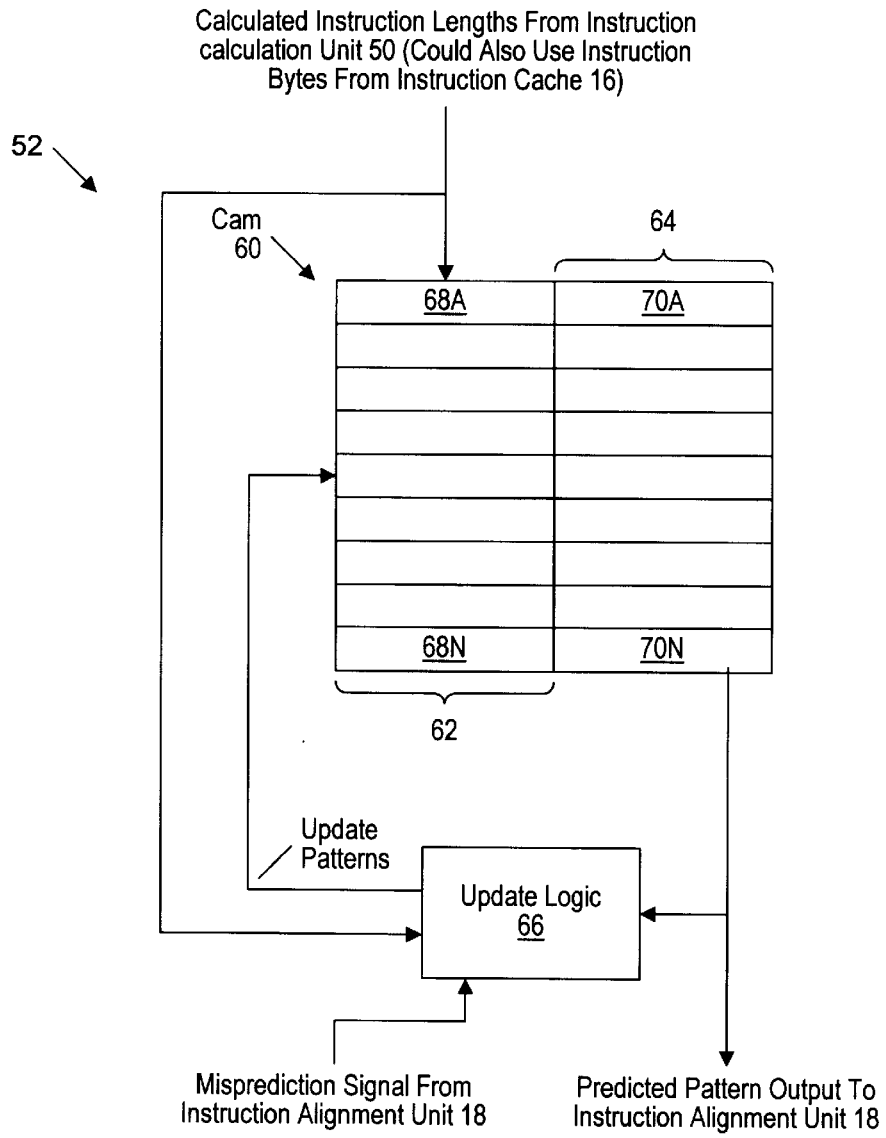
FIG. 7A is a block diagram showing one embodiment of the pattern detector from FIG. 6.

Turning now to FIG. 7A, more detail of this embodiment of pattern detector 52 is shown. In this embodiment, pattern detector 52 comprises CAM 60 and update logic 66. CAM 60 comprises a plurality of storage locations 62 for storing the initial values of instruction length sequences and a plurality of storage locations 64 for storing the final values of instruction length sequences. This embodiment of pattern detector 52 operates by comparing sequences of incoming instruction lengths (received from calculation unit 50) with the values stored in storage locations 68A–68N. When a match is found, the corresponding final sequence stored in the corresponding storage location 70A–70N is output by CAM 60.

When the input sequence misses in CAM 60, update logic 66 detects that no sequence is output. Update logic is configured to latch the initial sequence that missed in CAM 60 and then latch a predetermined number of next instruction lengths (in this case three) calculated by calculation unit 50. The entire sequence of instruction lengths is then written into CAM 60.

Figure 7B:
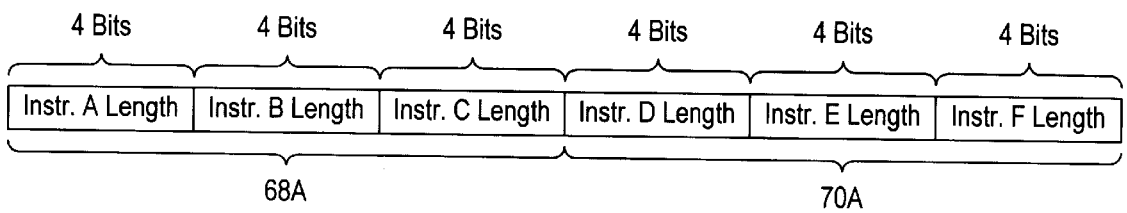
FIG. 7B is a block diagram showing one embodiment of a storage location within the pattern detector from FIG. 7A.

Turning now to FIG. 7B, more detail of one entry within CAM 60 is shown. In this embodiment, storage location 68A is configured to store the initial three instruction lengths in the sequence. Storage location 70A is configured to store the corresponding final three lengths in the sequence.

Figure 8:
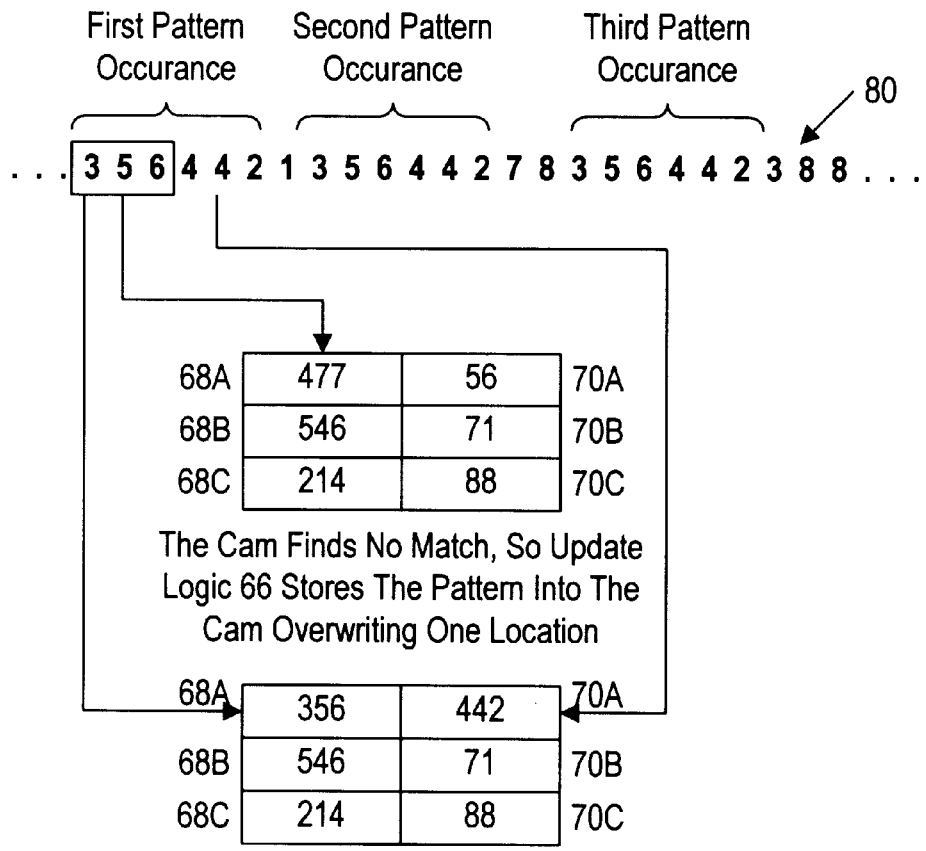
FIG. 8 is a diagram showing an example of the operation of one embodiment of the pattern detector from FIG. 7A.
Figure 8:
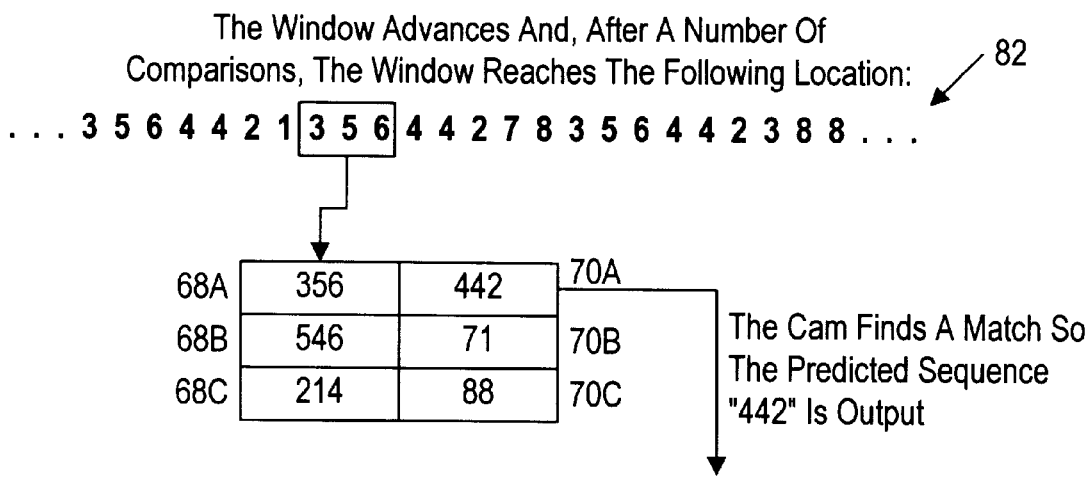

Turning now to FIG. 8, an example showing the operation of one embodiment of pattern generator 52 is shown. Pattern generator 52 is configured to receive a series of instruction lengths calculated by calculation unit 50. CAM 60 within pattern generator 52 selects a sequence of three instruction lengths and compares then with the initial sequences stored in storage locations 68A–68N (see step 80). As the initial sequence of 3-5-6 misses in CAM 60, update logic 66 stores it and the next three instruction lengths 4-4-2 into storage locations 68A and 70A, respectively.

With each comparison the "window" of three instruction lengths advances one instruction length. For example, the comparison after the comparison in step 80 would use the sequence 5-6-4. After a number of comparisons, the comparison window reaches the position indicated in step 82. This time, the sequence 3-5-6 hits in CAM 60. As a result, the previously stored final sequence of instruction lengths, i.e., 4-4-2, is output to alignment unit 18. Given the series of instruction lengths depicted in FIG. 8, this is a correct prediction.

Figure 9A:
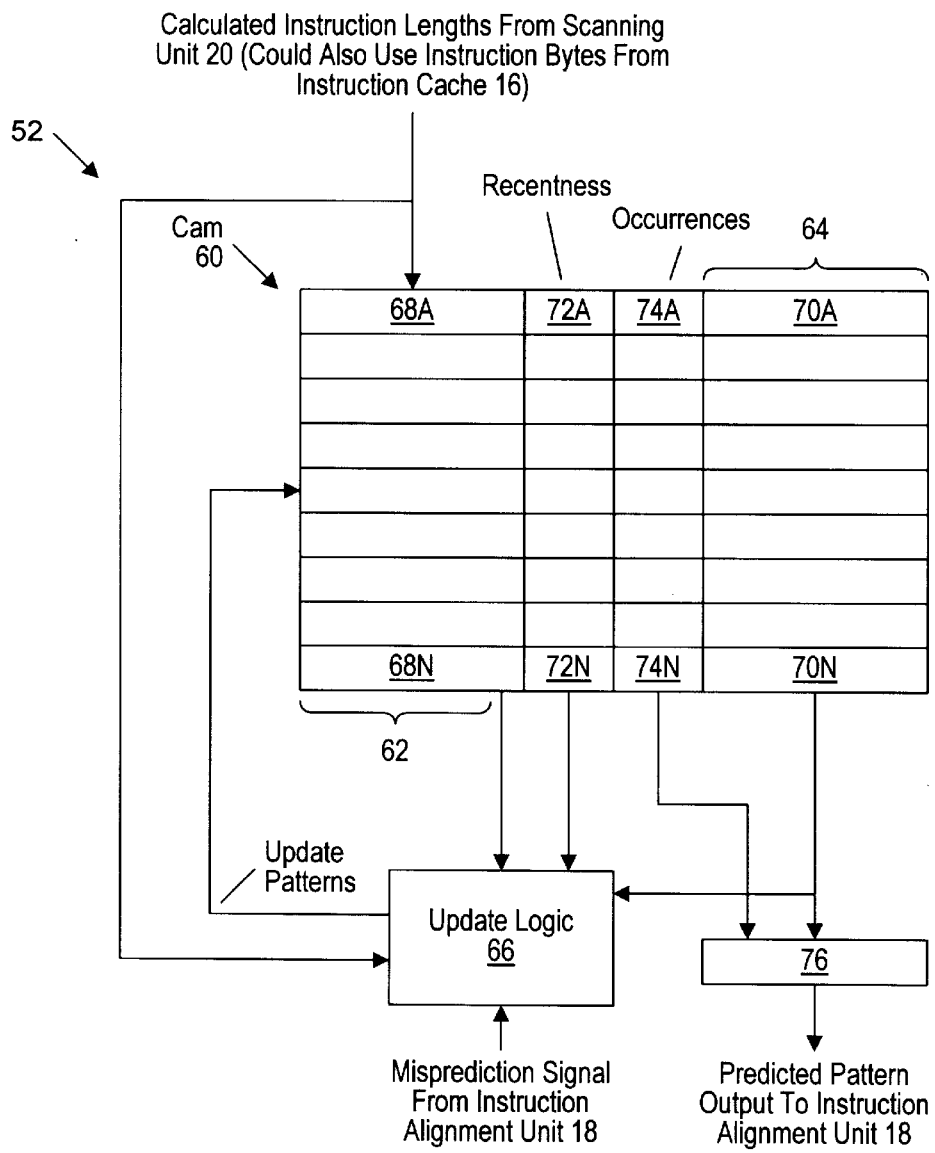
FIG. 9A is a block diagram showing one embodiment of the pattern detector from FIG. 6.

Turning now to FIG. 9A, yet another embodiment of pattern detector 52 is shown. In this embodiment, pattern detector 52 stores instruction length sequences, a recentness counter and an occurrences counter. Recentness counters are stored in storage locations 72A–72N, while occurrences counter are stored in storage locations 74A–74N. Each instruction sequence storage location 68A–68N is associated with one recentness counter storage location and one occurrences counter storage location. As in the embodiment shown in FIG. 7A, pattern detector 52 operates by comparing sequences of incoming instruction lengths (received from calculation unit 50) with the values stored in storage locations 68A–68N. However, when a match is found, the corresponding final sequence stored in the corresponding storage location 70A–70N is output by pattern detector 52 only if the occurrences counter is above a predetermined limit. Comparator 76 receives the occurrences counter for any matches and compares them with the predetermined limit. Advantageously, this configuration allows predictions to have a particular level of confidence, i.e., a particular number of occurrences, before they are output. The recentness counter is used to determine which storage location may be overwritten when CAM 60 is full.

Figure 9B:
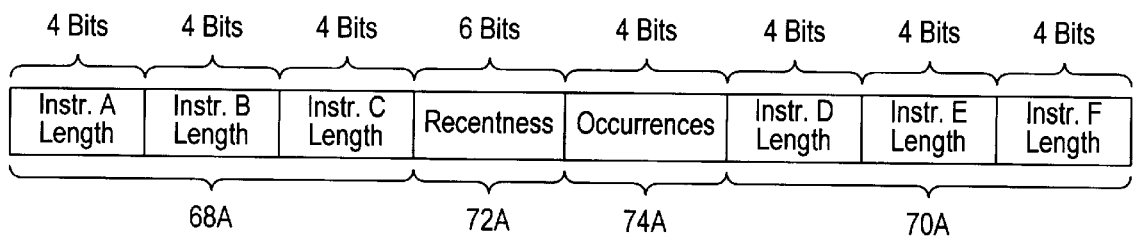
FIG. 9B is a block diagram showing one embodiment of a storage location within the pattern detector from FIG. 9A.

Turning now to FIG. 9B, detail of one group of storage locations within CAM 60 is shown. Storage location 68A stores the initial sequence of three instruction lengths. Storage location 72A stores the corresponding recentness counter. The recentness counter indicates how recently the corresponding initial sequence was accessed, relative to the other initial sequences stored in CAM 60. In the embodiment shown, CAM 60 is assumed to have 64 storage locations for storing initial instruction length sequences, thus the recentness counter is a 6-bit value. Each time an initial sequence is accessed, the corresponding recentness counter is set to its maximum value and all other recentness counters are decremented by one. Storage location 74A stores the corresponding occurrences counter, which is incremented when the initial sequence is accessed and the corresponding final sequence, stored in storage location 70A, is correctly predicted.

Figure 10:
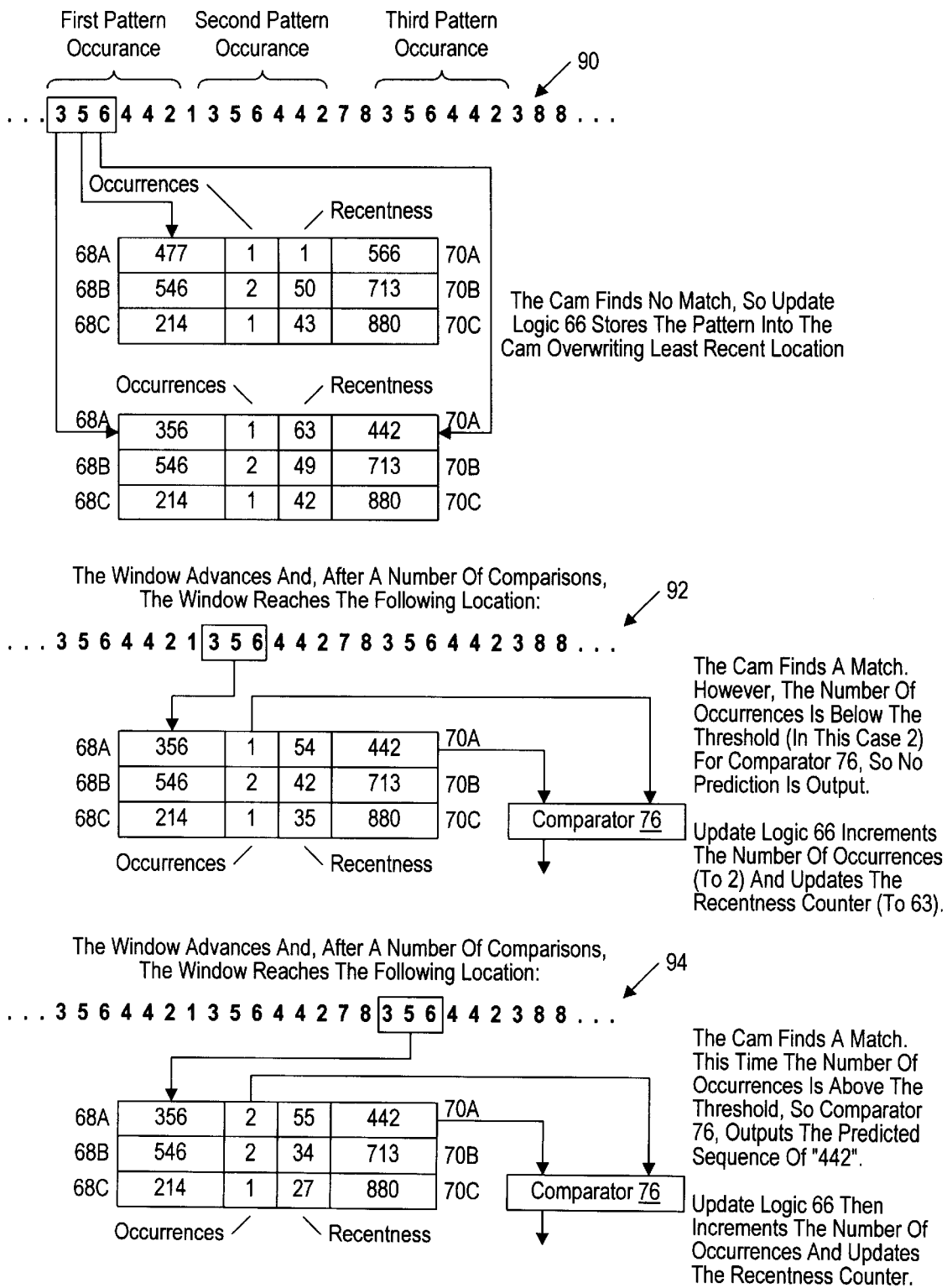
FIG. 10 is a diagram showing an example of the operation of one embodiment of the pattern detector from FIG. 9A.

Turning now to FIG. 10, a diagram illustrating the operation of this embodiment of pattern detector 52 is shown. Step 90 is depicts a first access to CAM 60. The initial sequence 3-5-6 is not stored in CAM 60, thus update logic 66 stores the pattern into CAM 60. As CAM 60 is full, update logic 66 overwrites the least recent group of storage locations, in this case 68A and 70A. The corresponding occurrences counter and recentness counter are set to one and 63, respectively.

The comparison window advances, and, after a number of comparisons, the window reaches the location depicted in step 92. This time the initial sequence 3-5-6 matches a sequence stored in CAM 60. Comparator 76 compares the occurrences counter with a predetermined limit (in this case two). As the occurrences counter corresponding to the stored sequence 3-5-6 is below the preset limit, the corresponding final sequence 4-4-2 (stored in storage location 70A) is not output. Instead, update logic 66 compares the final sequence with the sequence calculated by calculation unit 50. As the prediction is correct, the occurrences counter is incremented. The recentness counter is also set to the highest possible value, i.e., 63.

Again the window advances, and, after a number of comparisons, the window reaches the location depicted in step 94. This time the initial sequence matches and the corresponding occurrences counter meets the predetermined limit. Therefore, comparator 76 is configured to output the corresponding predicted sequence 4-4-2.

As explained above, this embodiment of pattern detector 52 waits until a predicted sequence of instruction lengths has occurred a predetermined number of times before the predicted sequence may be output. For code containing loops that are executed multiple times, this embodiment may advantageously refrain from outputting a predicted sequence until it appears that the sequence is in loop. This may advantageously reduce the number of incorrect predictions caused by code that is only performed once.

Figure 11:
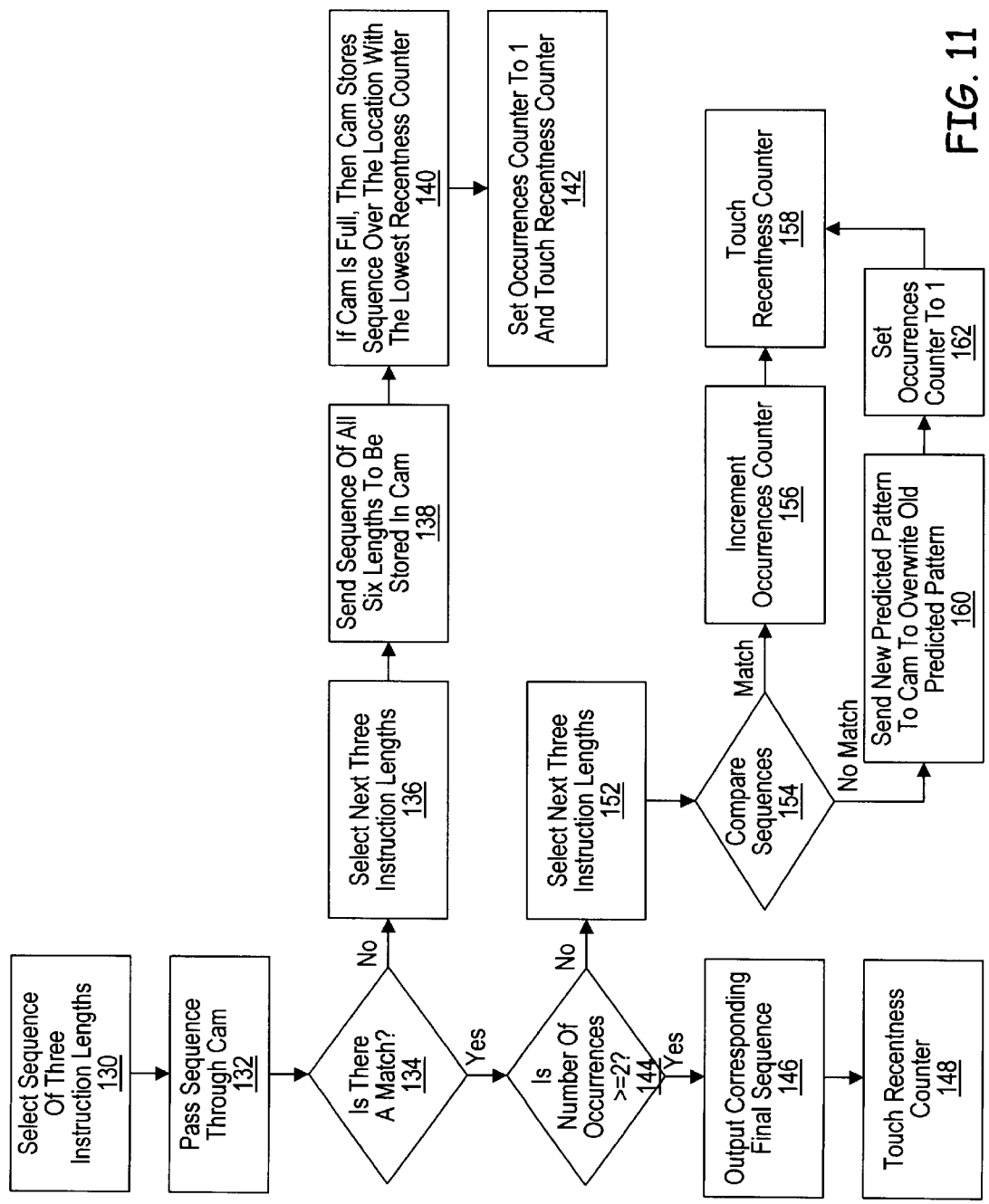
FIG. 11 is a flowchart showing one method for updating the pattern detector from FIG. 9A.

Turning now to FIG. 11, a flowchart is shown depicting one embodiment of the method used by pattern detector 52 of FIG. 9A. First, a sequence of three instruction lengths is selected (step 130) and compared with the contents of CAM 60 (step 132). If there is no match (step 134), update logic 66 waits and selects the next three instruction lengths as they are calculated by calculation unit 50 (step 136). Update logic 66 then send the entire sequence of six instruction lengths (the initial sequence of three and the final sequence of three) to CAM 60 (step 138). CAM 60 stores the sequence, overwriting the least recent entry if necessary (step 140). CAM 60 also sets the corresponding occurrences counter to one and "touches" the corresponding recentness counter. Touching involves setting the particular recentness counter to the highest possible value and then decrementing all other recentness counters by one.

Alternatively, if there is a match of the initial three instruction lengths in CAM 60 (step 134), the corresponding occurrences counter is checked (step 144). If the corresponding number of occurrences is greater than or equal to a predetermined limit (in this case two), then the corresponding final sequence is output (step 146). The recentness counter is also touched. If the number of occurrences is less than the predetermined limit, update logic 66 waits to select the next three instruction lengths calculated by calculation unit 50 (step 152). These lengths are then compared with the corresponding stored final sequence (step 154). If the sequences match, the prediction would have been correct. Thus the corresponding occurrences counter is incremented (step 156) and the recentness counter is touched (step 158). If the sequences do not match, update logic 66 overwrites the stored incorrect final sequence in CAM 60 with the new correct sequence (step 160). The corresponding occurrences counter is set to one (step 162), and the recentness counter is touched (step 158).

Note while the steps in FIG. 11 are shown in series for clarity, some of the steps may be performed in parallel. Further note that other values may be used for the predetermined limit of occurrences or for the number of instruction lengths in the initial sequence or final sequence.

In another embodiment of pattern detector 52, CAM 60 may be configured to store and detect patterns in instruction bytes. For example, CAM 60 may store 4-byte sequences of instruction bytes within storage locations 68A–68N. Upon finding a match, a corresponding sequence of stored instructions lengths may be output from storage locations 70A–70N. In the event the 4-byte sequence misses in CAM 60, update logic 66 may be configured to latch a predetermined number of calculated instruction lengths from calculation unit 50. Update logic 66 may then store the instruction bytes and instruction length sequence in CAM 60.

CAM 60 may also be configured to store opcodes or microprocessor state information in combination with instruction lengths. Advantageously, the additional information may improve the accuracy of predictions. For example, by storing opcodes and instruction lengths, pattern detector 52 may have greater "resolution" in distinguishing between instruction length sequences that begin with the same instruction lengths but comprise different opcodes.

In yet another embodiment of pattern detector 52, CAM 60 may be replaced by a neural network configured to rapidly detect patterns within the incoming stream of either instruction bytes of instruction length values. Note that instruction bytes, instruction lengths, and fetch addresses may be used in several different combinations with either a CAM structure or a neural network to predict instruction length sequences. Furthermore, other types of memory may be used in lieu of a neural network or a content addressable memory. For example, standard random access memory (RAM) cells may be used.

Figure 12:
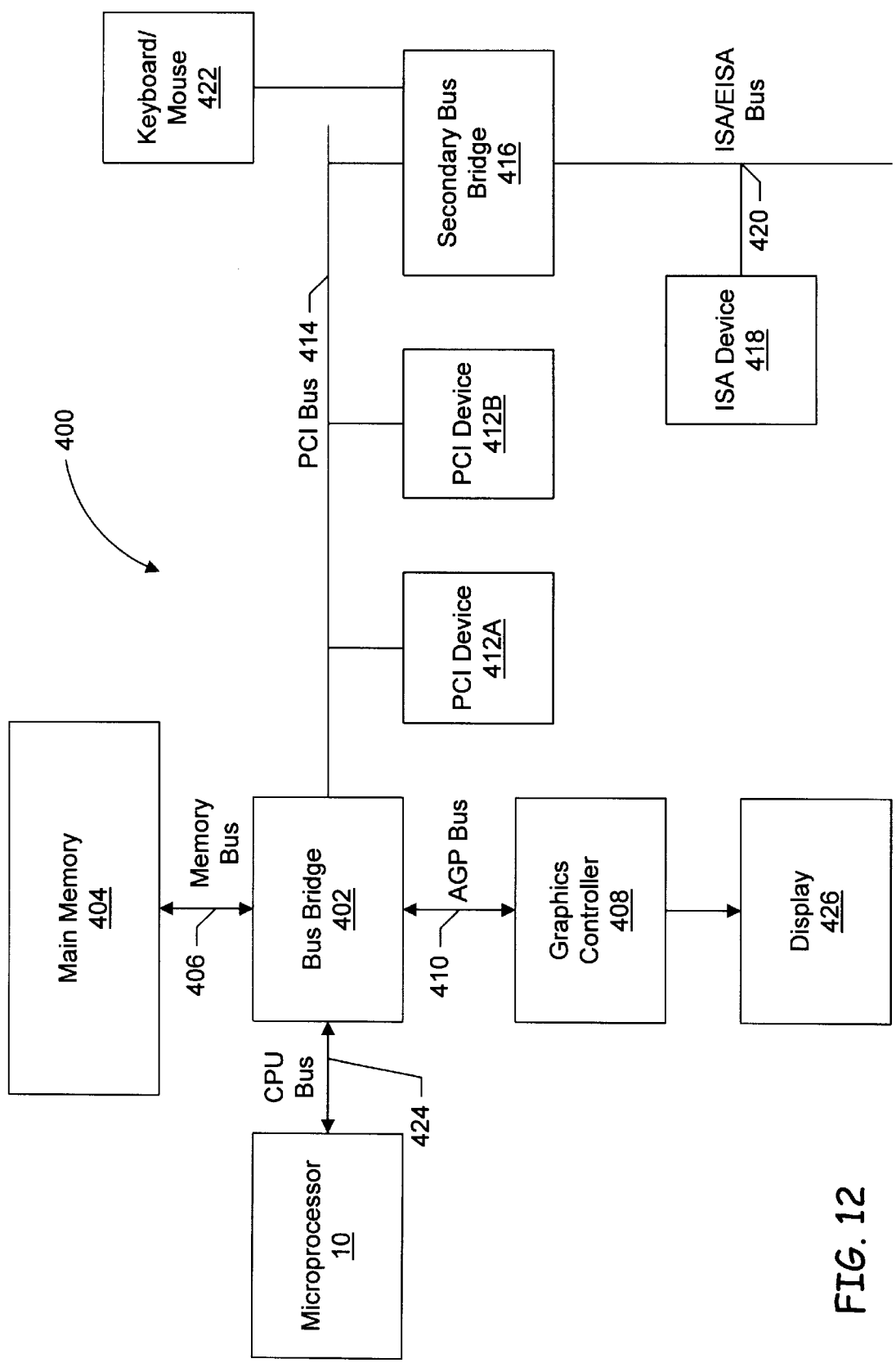
FIG. 12 is a diagram showing one embodiment of a computer system configured to utilize the microprocessor of FIG. 2.

Turning now to FIG. 12, a block diagram of one embodiment of a computer system 400 using microprocessor 10 and instruction cache 16 is shown. In this embodiment, microprocessor 10 is coupled to a variety of system components through a bus bridge 402. Other embodiments are possible and contemplated. In the depicted system, a main memory 404 is coupled to bus bridge 402 through a memory bus 406, and a graphics controller 408 is coupled to bus bridge 402 through an AGP bus 410. Finally, a plurality of PCI devices 412A–412B are coupled to bus bridge 402 through a PCI bus 414. A secondary bus bridge 416 may further be provided to accommodate an electrical interface to one or more EISA or ISA devices 418 through an EISA/ISA bus 420. Microprocessor 10 is coupled to bus bridge 402 through a CPU bus 424.

Bus bridge 402 provides an interface between microprocessor 10, main memory 404, graphics controller 408, and devices attached to PCI bus 414. When an operation is received from one of the devices connected to bus bridge 402, bus bridge 402 identifies the target of the operation (e.g. a particular device or, in the case of PCI bus 414, that the target is on PCI bus 414). Bus bridge 402 routes the operation to the targeted device. Bus bridge 402 generally translates an operation from the protocol used by the source device or bus to the protocol used by the target device or bus.

In addition to providing an interface to an ISA/EISA bus for PCI bus 414, secondary bus bridge 416 may further incorporate additional functionality, as desired. For example, in one embodiment, secondary bus bridge 416 includes a master PCI arbiter (not shown) for arbitrating ownership of PCI bus 414. An input/output controller (not shown), either external from or integrated with secondary bus bridge 416, may also be included within computer system 400 to provide operational support for a keyboard and mouse 422 and for various serial and parallel ports, as desired. An external cache unit (not shown) may further be coupled to CPU bus 424 between microprocessor 10 and bus bridge 402 in other embodiments. Alternatively, the external cache may be coupled to bus bridge 402 and cache control logic for the external cache may be integrated into bus bridge 402.

Main memory 404 is a memory in which application programs are stored and from which microprocessor 10 primarily executes. A suitable main memory 404 comprises DRAM (Dynamic Random Access Memory), and preferably a plurality of banks of SDRAM (Synchronous DRAM).

PCI devices 412A–412B are illustrative of a variety of peripheral devices such as, for example, network interface cards, video accelerators, audio cards, hard or floppy disk drives or drive controllers, SCSI (Small Computer Systems Interface) adapters and telephony cards. Similarly, ISA device 418 is illustrative of various types of peripheral devices, such as a modem, a sound card, and a variety of data acquisition cards such as GPIB or field bus interface cards.

Graphics controller 408 is provided to control the rendering of text and images on a display 426. Graphics controller 408 may embody a typical graphics accelerator generally known in the art to render three-dimensional data structures which can be effectively shifted into and from main memory 404. Graphics controller 408 may therefore be a master of AGP bus 410 in that it can request and receive access to a target interface within bus bridge 402 to thereby obtain access to main memory 404. A dedicated graphics bus accommodates rapid retrieval of data from main memory 404. For certain operations, graphics controller 408 may further be configured to generate PCI protocol transactions on AGP bus 410. The AGP interface of bus bridge 402 may thus include functionality to support both AGP protocol transactions as well as PCI protocol target and initiator transactions. Display 426 is any electronic display upon which an image or text can be presented. A suitable display 426 includes a cathode ray tube ("CRT"), a liquid crystal display ("LCD"), etc. It is noted that, while the AGP, PCI, and ISA or EISA buses have been used as examples in the above description, any bus architectures may be substituted as desired.

Numerous variations and modifications will become apparent to those skilled in the art once the above disclosure is fully appreciated. It is intended that the following claims be interpreted to embrace all such variations and modifications.

What is claimed is:

1. A microprocessor configured to execute variable length instructions comprising:

a cache array configured to receive a fetch address and in response output a corresponding plurality of instruction bytes;

an instruction length calculation unit coupled to said cache array and configured to receive said plurality of instruction bytes, wherein said calculation unit is configured to generate a particular instruction length corresponding to a particular instruction within said plurality of instruction bytes; and a pattern detector coupled to said cache array and said calculation unit, wherein said pattern detector is configured to store a plurality of instruction length sequences, wherein each of said plurality of instruction length sequences comprises an initial sequence and a final sequence, wherein said pattern detector is configured to receive a particular initial sequence corresponding to a particular portion of code from said calculation unit and in response output a corresponding final sequence, wherein said corresponding final sequence is usable to predict the lengths of instructions following the particular portion of code.

2. The microprocessor as recited in claim 1 wherein said pattern detector is configured to store the most recent instruction length sequences.

3. The microprocessor as recited in claim 1 wherein said pattern detector is configured to receive and store instruction bytes in addition to said instruction length sequences.

4. The microprocessor as recited in claim 3 wherein said pattern detector is configured to use said stored instruction bytes to select which stored final sequence to output.

5. The superscalar microprocessor as recited in claim 1 wherein said pattern detector is configured as a content addressable memory.

6. The superscalar microprocessor as recited in claim 1 wherein said pattern detector is configured as a neural network.

7. The microprocessor as recited in claim 1 wherein said cache array is configured to store a number of start and end bits, and wherein said calculation unit is configured to receive said start and end bits and use said start and end bits to generate said particular instruction length.

8. The microprocessor as recited in claim 1 wherein said corresponding final sequence output by said pattern detector is verified by an instruction alignment unit coupled to said pattern detector and said instruction calculation unit.

9. The microprocessor as recited in claim 1 wherein said pattern detector and said calculation unit are part of an instruction cache.

10. The microprocessor as recited in claim 1 wherein said pattern detector is configured to clear stored instruction length sequences upon receiving instruction length misprediction signals.

11. The microprocessor as recited in claim 1 wherein said pattern detector is configured to store a new instruction length sequence over the oldest stored instruction length sequence if said pattern detector is full.

12. The microprocessor as recited in claim 1 wherein said pattern detector is configured to store a new instruction length sequence over the stored instruction length sequence having the oldest last access.

13. The microprocessor as recited in claim 1 wherein said pattern detector is configured to maintain a recentness counter for each stored instruction length sequence.

14. The microprocessor as recited in claim 1 wherein said pattern detector is configured to maintain an occurrences counter for each stored instruction length sequence.

15. The microprocessor as recited in claim 14 wherein said pattern detector is configured to output a predicted final sequence only if the corresponding occurrences counter is above a predetermined limit.

16. A method for predicting instruction lengths for variable length instructions comprising:

reading a plurality of instruction bytes from a cache using fetch addresses;

generating instruction lengths for instructions within said pluralities of instruction bytes;

storing sequences of said instruction lengths, wherein said sequences comprise an first portion and a second portion;

comparing a particular sequence of instruction lengths with said stored first portions;

generating a plurality of predicted instruction lengths by selecting second portions that correspond to first portions that match said particular sequence; and verifying said plurality of predicted instruction lengths.

17. The method as recited in claim 16 further comprising clearing a stored sequence of instruction lengths which generated an instruction length misprediction.

18. The method as recited in claim 16 further comprising storing a plurality of instruction bytes.

19. The method as recited in claim 18 wherein said comparing further comprises comparing a particular set of instruction bytes with said stored plurality of instruction bytes.

* * * * *